US011368620B2

(12) United States Patent
Hashizume et al.

(10) Patent No.: US 11,368,620 B2
(45) Date of Patent: Jun. 21, 2022

(54) IMAGE PROCESSING APPARATUS, IMAGE PROCESSING METHOD, AND ELECTRONIC DEVICE

(71) Applicant: SONY CORPORATION, Tokyo (JP)

(72) Inventors: Jun Hashizume, Tokyo (JP); Tsutomu Nakajima, Tokyo (JP); Masao Zen, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/077,712

(22) PCT Filed: Jan. 17, 2017

(86) PCT No.: PCT/JP2017/001435
§ 371 (c)(1),
(2) Date: Aug. 13, 2018

(87) PCT Pub. No.: WO2017/149964
PCT Pub. Date: Sep. 8, 2017

(65) Prior Publication Data
US 2019/0045124 A1 Feb. 7, 2019

(30) Foreign Application Priority Data

Mar. 3, 2016 (JP) .............................. JP2016-040967

(51) Int. Cl.
*H04N 5/232* (2006.01)
*H04N 5/351* (2011.01)
(Continued)

(52) U.S. Cl.
CPC ............ *H04N 5/23254* (2013.01); *G03B 5/00* (2013.01); *H04N 5/2253* (2013.01); *H04N 5/232* (2013.01);
(Continued)

(58) Field of Classification Search
CPC .................................................. H04N 5/23267
See application file for complete search history.

(56) References Cited

U.S. PATENT DOCUMENTS

2006/0132612 A1* 6/2006 Kawahara .......... H04N 5/23248
348/208.6
2007/0236578 A1* 10/2007 Nagaraj ............. H04N 5/23248
348/208.99

(Continued)

FOREIGN PATENT DOCUMENTS

JP   2008-048313 A   2/2008
JP   2008-109270 A   5/2008
(Continued)

OTHER PUBLICATIONS

International Search Report and Written Opinion of PCT Application No. PCT/JP2017/001435, dated Apr. 11, 2017, 09 pages of English Translation and 09 pages of ISRWO.

(Continued)

*Primary Examiner* — Noam Reisner
(74) *Attorney, Agent, or Firm* — Chip Law Group

(57) ABSTRACT

There is provided an image processing apparatus that improves the efficiency of hand shake correction processing by an electronic type hand shake correcting system. The image processing apparatus including a memory section that memorizes a pixel signal output from an imaging element, a region determining section that determines a cutout region of the pixel signal memorized in the memory section on a basis of motion information of the imaging element, and an image processing section that executes image processing with regard to image quality for a pixel signal in the cutout region determined by the region determining section.

11 Claims, 10 Drawing Sheets

(51) Int. Cl.
*G03B 5/00* (2021.01)
*H04N 5/225* (2006.01)
*H04N 5/374* (2011.01)

(52) U.S. Cl.
CPC ..... *H04N 5/23264* (2013.01); *H04N 5/23274* (2013.01); *G03B 2207/005* (2013.01); *H04N 5/351* (2013.01); *H04N 5/374* (2013.01)

(56) References Cited

U.S. PATENT DOCUMENTS

| | | |
|---|---|---|
| 2008/0042046 A1 | 2/2008 | Mabuchi |
| 2010/0166300 A1* | 7/2010 | Spampinato ........... H04N 5/144 |
| | | 382/162 |
| 2012/0236164 A1 | 9/2012 | Nakano |
| 2016/0014359 A1* | 1/2016 | Ota ..................... H04N 5/3696 |
| | | 348/223.1 |

FOREIGN PATENT DOCUMENTS

| | | |
|---|---|---|
| JP | 2009-246441 A | 10/2009 |
| JP | 2012-199691 | 10/2012 |
| JP | 2012-199691 A | 10/2012 |
| JP | 2015-111761 A | 6/2015 |
| JP | 2015-220690 A | 12/2015 |
| WO | 2016/181717 A1 | 11/2016 |

OTHER PUBLICATIONS

International Preliminary Report on Patentability of PCT Application No. PCT/JP2017/001435, dated Sep. 4, 2018, 10 pages of English Translation and 06 pages of IPRP.

\* cited by examiner

IMAGE PROCESSING APPARATUS, IMAGE PROCESSING METHOD, AND ELECTRONIC DEVICE

CROSS REFERENCE TO RELATED APPLICATIONS

This application is a U.S. National Phase of International Patent Application No. PCT/JP2017/001435 filed on Jan. 17, 2017, which claims priority benefit of Japanese Patent Application No. JP 2016-040967 filed in the Japan Patent Office on Mar. 3, 2016. Each of the above-referenced applications is hereby incorporated herein by reference in its entirety.

TECHNICAL FIELD

The present disclosure relates to an image processing apparatus, an image processing method, a computer program, and an electronic device.

BACKGROUND ART

In the case where an imaging apparatus executes imaging processing in a state where a photographer is holding the imaging apparatus by hands, image disturbance may occur due to a hand shake. For that reason, the imaging apparatus includes a hand shake correcting function. In this hand shake correcting system, generally, there are two types of an optical type (OIS: Optical Image Stabilization) and an electronic type (EIS: Electrical Image Stabilization).

An optical type hand shake correcting system needs a driving mechanism for moving an optical system. Accordingly, a size and a cost become also large. On the other hand, an electronic type hand shake correcting system is a system that calculates an amount of deviation of an image due to a hand shake and performs processing in accordance with the amount of deviation. Accordingly, a driving mechanism like an optical type hand shake correcting system is unnecessary. As the technology with regard to an electronic type hand shake correcting system, for example, there are Patent Literature 1 and the like.

CITATION LIST

Patent Literature

Patent Literature 1: JP 2015-220690A

Disclosure of Invention

Technical Problem

The present disclosure proposes an image processing apparatus, an image processing method, a computer program, and an electronic device that are novel, have been improved, and, can improve the efficiency of hand shake correction processing by an electronic type hand shake correcting system.

Solution to Problem

According to the present disclosure, there is provided an image processing apparatus including: a memory section that memorizes a pixel signal output from an imaging element; a region determining section that determines a cutout region of the pixel signal memorized in the memory section on a basis of motion information of the imaging element; and an image processing section that executes image processing with regard to image quality for a pixel signal in the cutout region determined by the region determining section.

In addition, according to the present disclosure, there is provided an image processing method including: memorizing a pixel signal output from an imaging element; determining a cutout region of the memorized pixel signal on a basis of motion information of the imaging element; and executing image processing with regard to image quality for a pixel signal in the determined cutout region.

In addition, according to the present disclosure, there is provided a computer program that makes a computer execute: memorizing a pixel signal output from an imaging element; determining a cutout region of the memorized pixel signal on a basis of motion information of the imaging element; and executing image processing with regard to image quality for a pixel signal in the determined cutout region.

In addition, according to the present disclosure, there is provided an electronic device including the above-described image processing apparatus.

Advantageous Effects of Invention

As described in the above, according to the present disclosure, it is possible to provide an image processing apparatus, an image processing method, a computer program, and an electronic device that are novel, have been improved, and, can improve the efficiency of hand shake correction processing by an electronic type hand shake correcting system.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
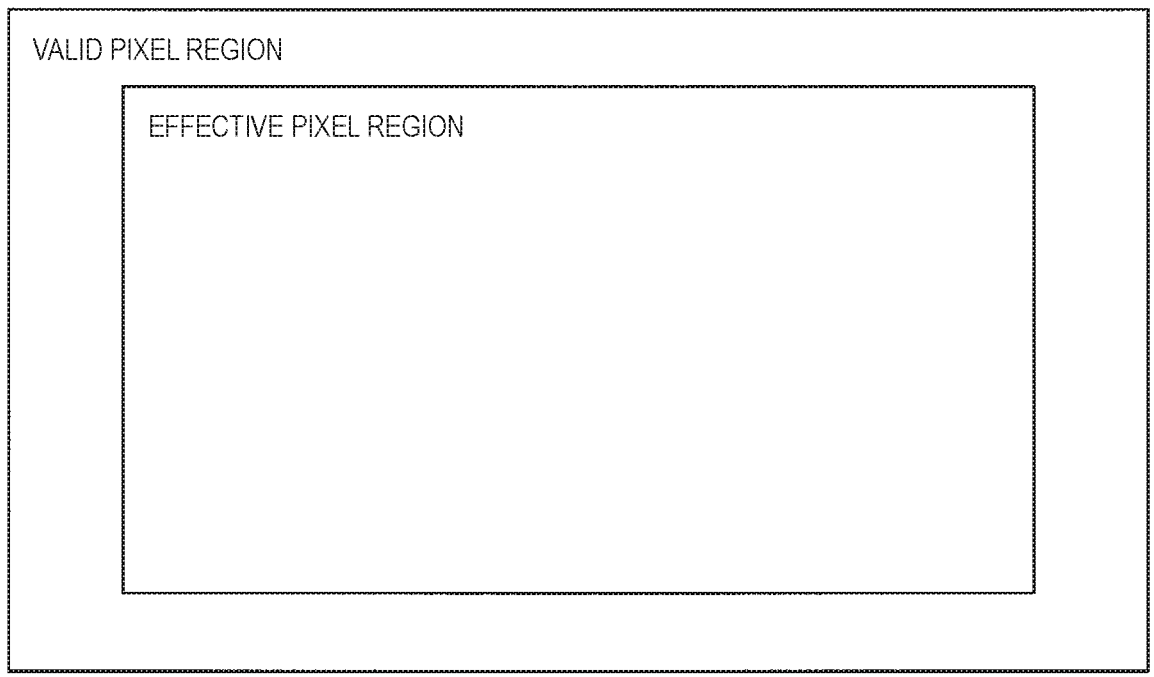
FIG. 1 is an explanatory illustration showing a valid pixel region and an effective pixel region.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

It should be noted that description is given in the following order.
1. Embodiment of Present Disclosure
1. 1. Outline
1. 2. Functional constitution example of imaging apparatus
1. 3. Constitution example of sensor module
1. 4. Operation example
2. Example of Application to Mobile Objects
3. Conclusion

1. Embodiment of the Present Disclosure

[1.1. Outline]

Before describing the embodiment of the present disclosure in detail, first, an outline of the embodiment of the present disclosure is described.

In the case where an imaging apparatus executes imaging processing in a state where a photographer is holding the imaging apparatus by hands, image disturbance may occur due to a hand shake. For that reason, the imaging apparatus includes a hand shake correcting function. In this hand shake correcting system, generally, there are two types of an optical type and an electronic type.

An optical type hand shake correcting system needs a driving mechanism for moving an optical system. Accordingly, a size and a cost may become also large. On the other hand, an electronic type hand shake correcting system is a system that calculates an amount of deviation of an image due to a hand shake and performs processing in accordance with the amount of deviation. Accordingly, a driving mechanism like in an optical type hand shake correcting system is unnecessary. Therefore, in a small portable terminal like a smart phone and a wearable camera, an electronic type hand shake correcting system is mainly used.

The electronic type hand shake correcting system needs to detect the direction of a hand shake on the basis of information on images of a plurality of frames for hand shake correction. The existing electronic type hand shake correcting systems send information on all the valid pixel regions corresponding to all the ranges output by an image sensor to an application processor (AP), detect the direction of a hand shake on the AP side, and, output an image in which the hand shake has been corrected. Here, the image for which the hand shake has been corrected is created from information not on all the valid pixel region, but on an effective pixel region where some regions are cut out. FIG. 1 is an explanatory illustration showing a valid pixel region and an effective pixel region corresponding to an image, for which a hand shake is corrected, that is displayed on a screen, or, is recorded. In this way, the range of an effective pixel region is narrower than a valid pixel region.

However, the AP can execute, in addition to the processing for detecting the direction of a hand shake, various kinds of image processing, such as automatic white balance processing, automatic exposure processing, distortion correction processing, defect correction processing, noise reduction processing, and high dynamic range synthesis processing. Since these kinds of image processing are performed for a valid pixel region, the image processing for a region that is not used after the hand shake correction processing by the electronic type hand shake correcting system, becomes useless. For example, in the case where regions of 10%, at top, bottom, left, and right, of an effective pixel region are valid pixel regions, the processing amount of image processing for the whole valid pixel region increases by 44% as compared with the processing amount of image processing for a valid pixel region. In the case where regions of 12.5%, at top, bottom, left, and right, of an effective pixel region are valid pixel regions, the processing amount of image processing for the whole valid pixel region increases by 56% as compared with the processing amount of image processing for a valid pixel region. Therefore, in the case where the hand shake correction processing is performed by the electronic type hand shake correcting system, the AP consumes useless electric power due to the image processing for the whole valid pixel region.

Moreover, the output frame rate of data from an image sensor is limited to rates of the processing in the AP and an interface band. For example, in the case where the size of an image processed by the AP is a full HD size and a frame rate is 60 fps, even if an image sensor can output pixel signals at a rate (speed) higher than 60 fps, pixel signals cannot be output at a rate higher than 60 fps. If the image sensor cannot output pixel signals at a rate higher than 60 fps, the distortion of a moving object called focal plane distortion may arise, and the processing for correcting distortion becomes indispensable on the AP side. Therefore, in the case where the output frame rate of the data from the image sensor is limited to rates of the processing in the AP and an interface band, power consumption is further increased.

Then, the disclosers of the present case have made extensive studies on techniques capable of improving the efficiency of hand shake correction processing by the electronic type hand shake correcting system in view of the above-mentioned points. As a result, the disclosers of the present case have devised a technique capable of improving the efficiency of hand shake correction processing with the electronic type hand shake correcting system by performing the hand shake correction with the electronic type hand shake correcting system by simple processing and by reducing power consumption as compared with the hand shake correction processing with the usual electronic type hand shake correcting system.

In the above, an outline of the embodiment of the present disclosure has been described.

[1.2. Functional Constitution Example]

Figure 2:
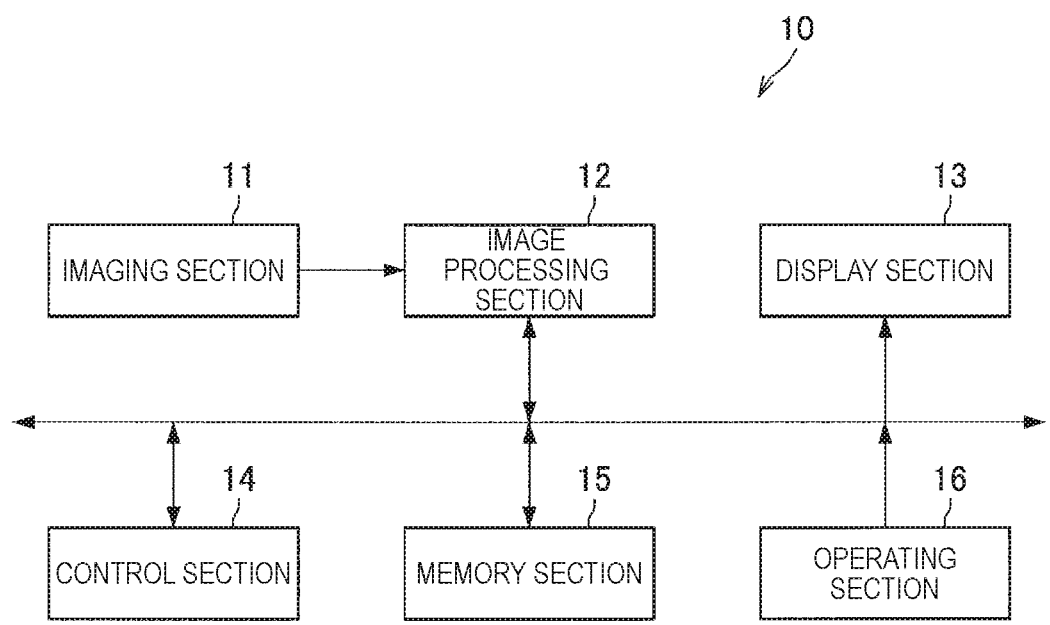
FIG. 2 is an explanatory diagram showing a functional constitution example of an electronic device 10 according to the embodiment of the present disclosure.

Successively, a functional constitution example of an electronic device according to the embodiment of the present disclosure is described. FIG. 2 is an explanatory diagram showing a functional constitution example of an electronic device 10 according to the embodiment of the present disclosure. Hereinafter, the functional constitution example of the electronic device 10 according to the embodiment of the present disclosure is described using FIG. 2.

As shown in FIG. 2, the electronic device 10 according to the embodiment of the present disclosure includes an imaging section 11, an image processing section 12, a display section 13, a control section 14, a memory section 15, and an operating section 16.

The imaging section 11 includes a lens, a sensor module, etc., and accumulates electrons during a predetermined period correspondingly to an image formed on a light receiving surface of the sensor module via the lens. The imaging section 11 performs predetermined signal processing for signals corresponding to the accumulated electrons. Then, the imaging section 11 outputs the signals after having performed the signal processing to the image processing section 12. In this connection, a constitution of the sensor module included in the imaging section 11 will be described in detail later.

As the above-described predetermined signal processing, the imaging section 11 can execute signal processing, such as hand shake correction processing by an electronic type hand shake correcting system, automatic white balance processing, automatic exposure processing, distortion correction processing, defect correction processing, noise reduction processing, and high dynamic range synthesis processing.

The image processing section 12 includes, for example, an application processor (AP), and, executes image processing using signals output from the imaging section 11. The image processing executed by the image processing section 12 includes, for example, demosaic processing using signals output from the imaging section 11, display processing for images after the demosaic processing onto the display section 13, memory processing for the memory section 15, and so on.

The display section 13 is a display device including, for example, a liquid crystal display, an organic EL display, or the like. In the display section 13, display contents are controlled by the control section 14. For example, the display section 13 displays images that have been imaged by the imaging section 11 and have been subjected to the image processing by the image processing section 12, on the basis of the control of the control section 14.

The control section 14 includes, for example, processors, such as a CPU (Central Processing Unit); a ROM, a RANI, and the like, and, controls operation of each section of the electronic device 10.

The memory section 15 includes, for example, memory media, such as a flash memory and other nonvolatile memories. The memory section 15 memorizes images that have been imaged by the imaging section 11 and have been subjected to image processing by the image processing section 12. The images memorized by the memory section 15 may be displayed on the display section 13 correspondingly to the operation of a user of the electronic device 10.

The operating section 16 is a device for operating the electronic device 10, and, includes, for example, a button, a touch panel, and so on. In the case where the operating section 16 includes a touch panel, the touch panel is disposed on the display surface of the display section 13. In the case where a user of the electronic device 10 wants to record an image imaged by the imaging section 11 in the electronic device 10, the user generates a shutter trigger by operating a predetermined button of the operating section 16. Upon detection of the generation of the shutter trigger, the imaging section 11 or the image processing section 12 execute processing for recording an image in the electronic device 10 in response to the generation of the shutter trigger.

In the above, the functional constitution example of the electronic device 10 according to the embodiment of the present disclosure has been described. Successively, description is given for a constitution example of an image sensor included in the imaging section 11 of the electronic device 10 according to the embodiment of the present disclosure.

[1.3. Constitution Example of Sensor Module]

Figure 3:
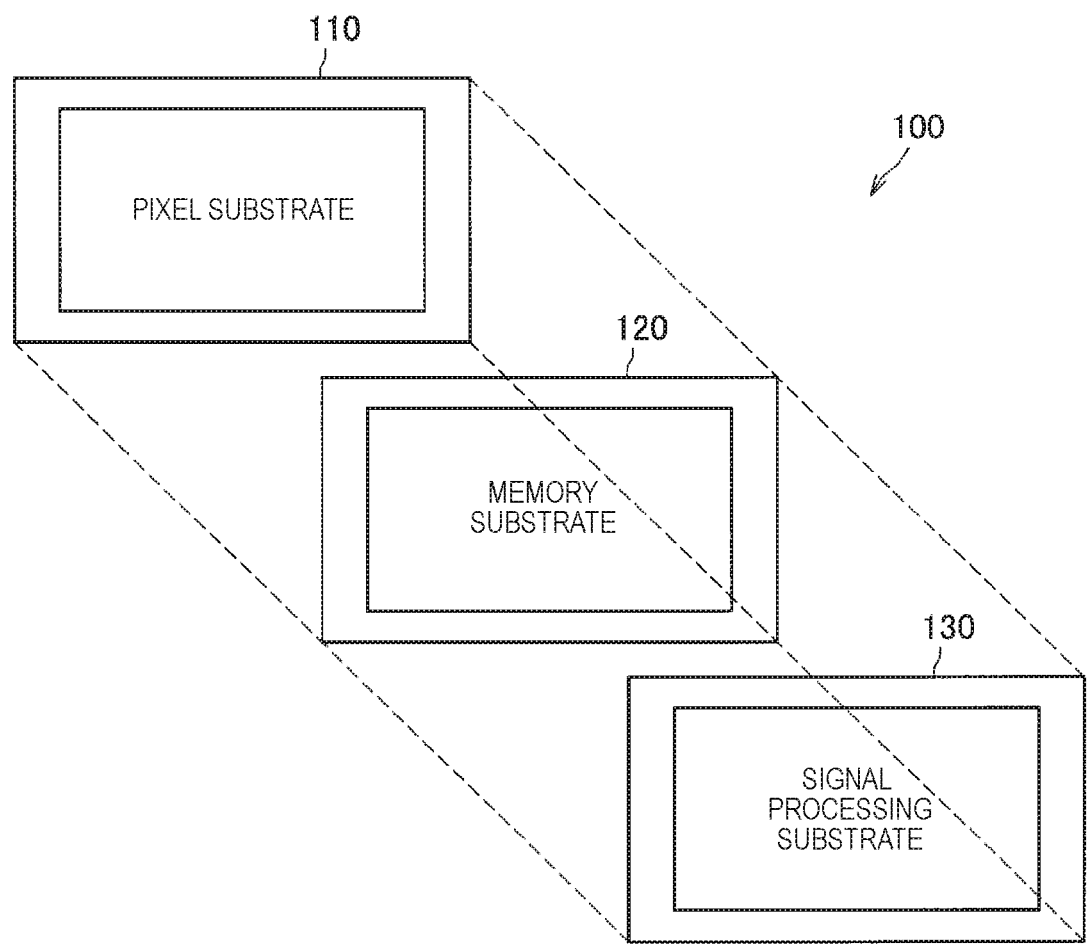
FIG. 3 is an explanatory illustration showing a constitution example of a sensor module 100.

FIG. 3 is an explanatory illustration showing a constitution example of the sensor module 100 included in the imaging section 11. The sensor module 100 according to the embodiment of the present disclosure is one example of an image processing apparatus of the present disclosure, and, as shown in FIG. 3, includes three stacked substrates. The sensor module 100 according to the embodiment of the present disclosure includes a pixel substrate 110, a memory substrate 120, a signal processing substrate 130 that are stacked in this order.

The pixel substrate 110 is a substrate that includes an imaging element including a pixel region in which unit pixels are formed in an array form. Each unit pixel receives light from a photographic subject, photoelectrically converts the incidence light, accumulates electric charges, and outputs the electric charges as a pixel signal at a predetermined timing. The pixel signals output from the pixel substrate 110 are stored in the memory substrate 120, and, are subjected to signal processing in the signal processing substrate 130. In addition, the pixel substrate 110 includes an AD converter to convert an analog signal into a digital signal. That is, the pixel signal output from the pixel substrate 110 is a digital signal.

The memory substrate 120 is a substrate that includes a memory, such as a DRAM (Dynamic Random Access Memory) to store temporarily pixel signals output from the pixel substrate 110. The memory substrate 120 has a capacity capable of storing temporarily pixel signals of a plurality of frames, for example, frames enough for executing hand shake correction processing with the electronic type hand shake correcting system in the signal processing substrate 130. The pixel signals stored in the memory substrate 120 are read out on the basis of a read-out instruction from the signal processing substrate 130.

The signal processing substrate 130 executes various kinds of signal processing for the pixel signals stored in the memory substrate 120. The signal processing executed by the signal processing substrate 130 is signal processing with regard to image quality for the pixel signals stored in the memory substrate 120. For example, it is possible to execute signal processing, such as hand shake correction processing with an electronic type hand shake correcting system, automatic white balance processing, automatic exposure processing, distortion correction processing, defect correction processing, noise reduction processing, and high dynamic range synthesis processing.

In this connection, FIG. 3 shows an illustration of a constitution of the sensor module 100 where the pixel substrate 110, the memory substrate 120, and the signal processing substrate 130 are stacked in this order. However, the present disclosure is not limited to such an example. For example, the sensor module 100 may have a constitution where the pixel substrate 110, the signal processing substrate 130, and the memory substrate 120 are stacked in this order.

In the above, the constitution example of the sensor module 100 has been described using FIG. 3. Successively, a functional constitution example of the sensor module 100 will be described.

Figure 4:
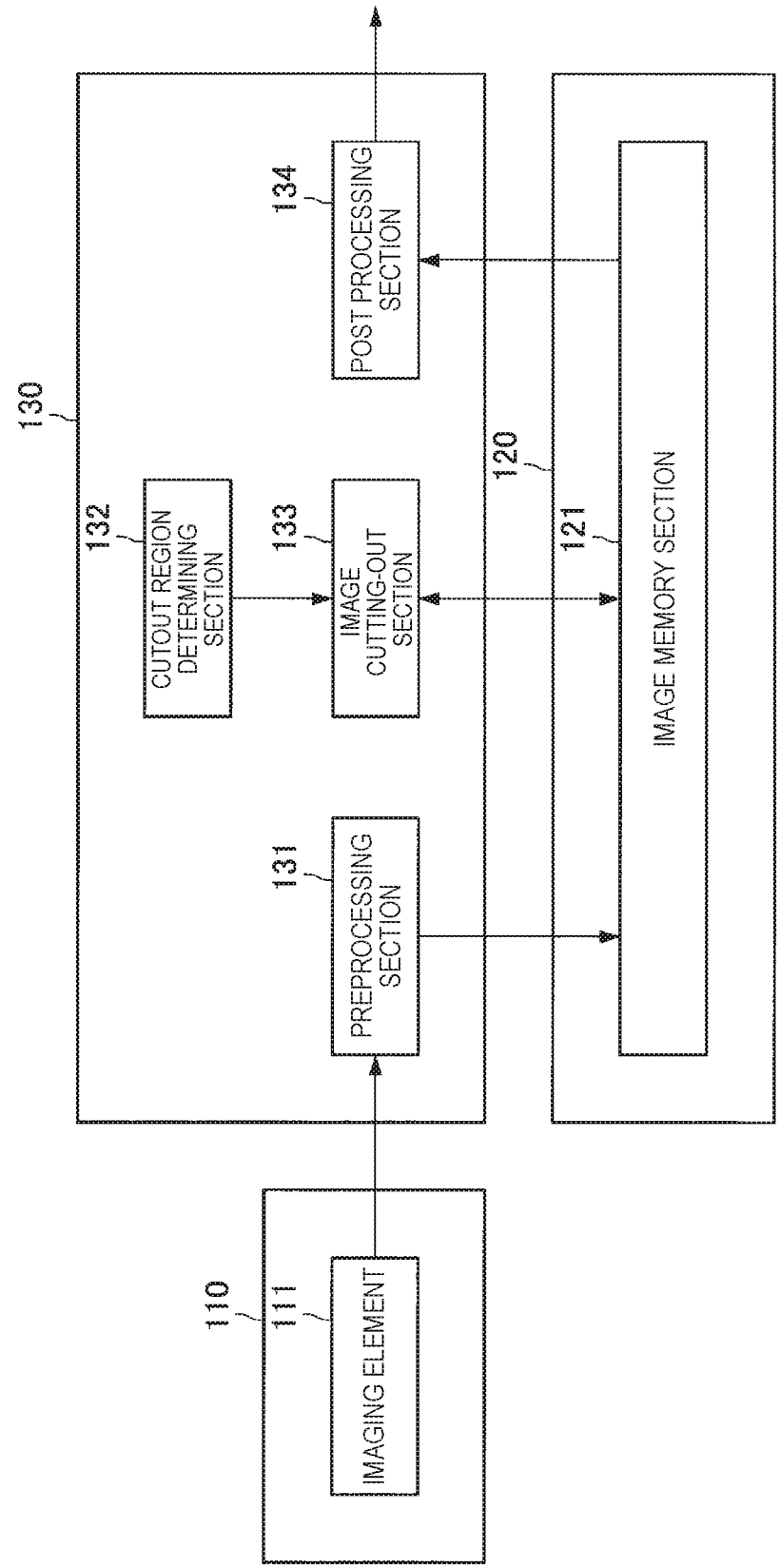
FIG. 4 is an explanatory diagram showing a functional constitution example of a sensor module 100.

FIG. 4 is an explanatory diagram showing a functional constitution example of the sensor module 100 according to the embodiment of the present disclosure. Hereinafter, the functional constitution example of the sensor module 100 according to the embodiment of the present disclosure will be described using FIG. 4.

The pixel substrate 110 includes the imaging element 111 including a pixel region where unit pixels are formed in an array form. The pixel signals output from the imaging element 111 are sent once to the signal processing substrate 130, and, thereafter, are sent to the memory substrate 120.

The memory substrate 120 includes an image memory section 121 including a DRAM (Dynamic Random Access Memory), and so on. The image memory section 121 stores temporarily pixel signals output from the imaging element 111. The image memory section 121 has a capacity capable of storing temporarily pixel signals of a plurality of frames, for example, frames enough for executing hand shake correction processing with the electronic type hand shake correcting system in the signal processing substrate 130. The pixel signals stored in the image memory section 121 are read out on the basis of a read-out instruction from the signal processing substrate 130.

The signal processing substrate 130 includes a preprocessing section 131, a cutout region determining section 132, an image cutting-out section 133, and a post processing section 134.

The preprocessing section 131 applies signal processing for pixel signals output from the imaging element 111. The preprocessing section 131 makes the image memory section 121 memorize the pixel signals after having been applied with the signal processing. The signal processing executed by the preprocessing section 131 may include, for example, gain adjustment processing, clamping processing, pixel addition processing, and so on.

The cutout region determining section 132 determines a cutout region when the image cutting-out section 133 cuts out an effective pixel region from a valid pixel region. At the time of determining a cutout region, for example, the cutout region determining section 132 may perform a motion vector search (ME: Motion Estimation) to estimate a motion amount of an image using pixel signals of a plurality of frames, or, may use sensing data output from a gyro sensor included in the electronic device 10.

The image cutting-out section 133 executes processing for cutting out an effective pixel region from a valid pixel region for the pixel signals stored in the image memory section 121. The image cutting-out section 133 cuts out an effective pixel region from a valid pixel region on the basis of a cutout region determined by the cutout region determining section. Upon cutting out the effective pixel region from the valid pixel region, the image cutting-out section 133 makes the image memory section 121 memorize the pixel signals after the cutout.

The post processing section 134 executes signal processing for the pixel signals after the image cutting-out section 133 has cut out the effective pixel region. Upon executing the signal processing for the pixel signals after having cut out the effective pixel region, the post processing section 134 outputs the pixel signals after the signal processing to the image processing section 12. The signal processing executed by the post processing section 134 includes, for example, automatic white balance processing, automatic exposure processing, distortion correction processing, defect correction processing, noise reduction processing, high dynamic range synthesis processing, and the like.

The post processing section 134 executes the signal processing for the pixel signals after the image cutting-out section 133 has cut out the effective pixel region, not for the pixel signals of the whole valid pixel region. Therefore, the post processing section 134 can execute the signal processing with a small processing amount as compared with the signal processing for the pixel signals of the whole valid pixel region.

The sensor module 100 according to the embodiment of the present disclosure can perform hand shake correction by the electronic type hand shake correcting system with simple processing by including the constitution as shown in FIG. 4.

Moreover, the sensor module 100 according to the embodiment of the present disclosure can reduce power consumption by including the constitution as shown in FIG. 4 as compared with the hand shake correction processing by the usual electronic type hand shake correcting system. Therefore, the sensor module 100 according to the embodiment of the present disclosure can improve the efficiency of the hand shake correction processing by the electronic type hand shake correcting system.

Figure 5:
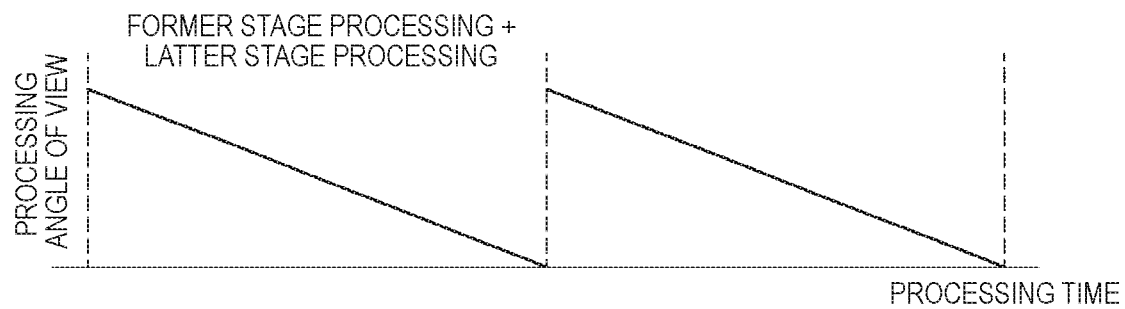
FIG. 5 is an explanatory diagram for describing the effects of a sensor module 100 according to the same embodiment.
Figure 6:
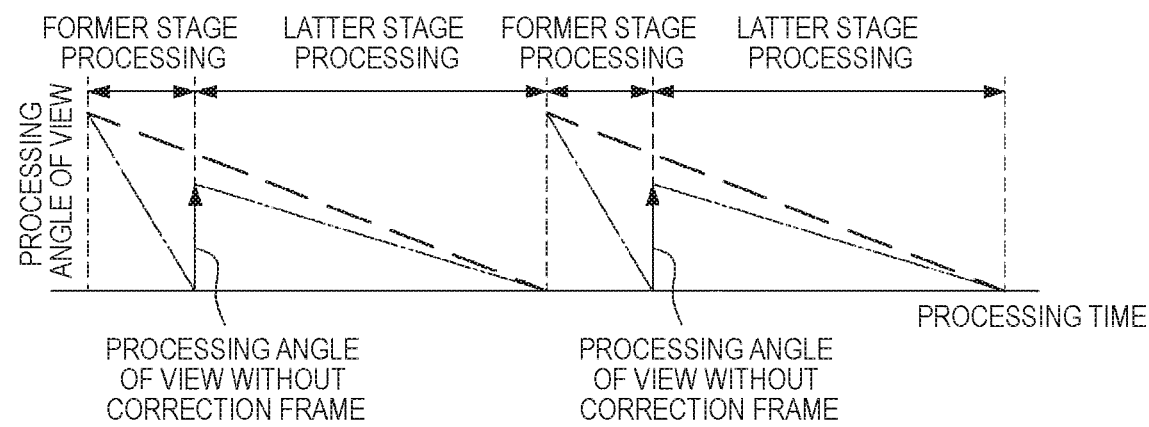
FIG. 6 is an explanatory diagram for describing the effects of a sensor module 100 according to the same embodiment.

FIG. 5 and FIG. 6 are explanatory diagrams for describing the effects of the sensor module 100 according to the embodiment of the present disclosure. FIG. 5 is an explanatory diagram showing an example of processing time in the case of performing cutting out an effective pixel region and hand shake correction processing by the electronic type hand shake correcting system at the latter stage of the sensor module 100. Moreover, FIG. 6 is an explanatory diagram showing an example of processing time in the case of performing cutting out an effective pixel region and hand shake correction processing by the electronic type hand shake correcting system in the sensor module 100.

In the case of performing cutting out an effective pixel region and hand shake correction processing by the electronic type hand shake correcting system at the latter stage of the sensor module 100, as shown in FIG. 5, the sensor module 100 needs to move simultaneously former stage processing (gain adjustment processing, clamping processing, etc.) and latter stage processing (automatic white balance processing, automatic exposure processing, distortion correction processing, defect correction processing, noise reduction processing, high dynamic range synthesis processing, etc.). Therefore, the processing time spent on the internal processing of the sensor module 100 is uniquely determined by a signal processing band at the inside of the sensor module 100 and an interface band and a signal processing band of the AP (image processing section 12). As mentioned above, in the case where the size of an image processed by the AP is a full HD size and a frame rate is 60 fps, even if the sensor module 100 can output pixel signals at a rate higher than 60 fps, it cannot output pixel signals at a rate higher than 60 fps to the AP.

Moreover, in the case of performing cutting out an effective pixel region and hand shake correction processing by the electronic type hand shake correcting system at the latter stage of the sensor module 100, it is necessary to perform processing for pixel signals of the whole valid pixel region until the hand shake correction processing in the AP has been completed. Therefore, a resource necessary for the latter stage processing in the sensor module 100, or a resource necessary for the signal processing at the interface band between the sensor module 100 and the AP and at the AP must be prepared such that the whole valid pixel region can be processed.

On the other hand, in the case of disposing the image memory section 121 in the inside of the sensor module 100 and performing cutting out an effective pixel region and hand shake correction processing by the electronic type hand shake correcting system at the inside of the sensor module 100, as shown in FIG. 6, the former stage processing and the latter stage processing can be processed separately. This is because the pixel signals after the former stage processing are temporarily stored in the image memory section 121. That is, it becomes possible for the sensor module 100 according to the embodiment of the present disclosure to convert a frame rate at the former stage processing and the latter stage processing.

The sensor module 100 according to the embodiment of the present disclosure can process the former stage processing and the latter stage processing separately as shown in FIG. 6, whereby the former stage processing can be operated at a high rate and the latter stage processing can be operated at a low rate. For example, the sensor module 100 according to the embodiment of the present disclosure can operate the former stage processing at 480 to 960 fps. Moreover, the sensor module 100 according to the embodiment of the present disclosure can prevent the occurrence of focal plane distortion by operating the former stage processing at a high rate. Therefore, the sensor module 100 according to the embodiment of the present disclosure does not need to perform processing for correcting focal plane distortion, and, can reduce the power consumption necessary for the latter stage processing. Moreover, in the sensor module 100 according to the embodiment of the present disclosure, since it becomes possible to realize the hand shake correction processing by the electronic type hand shake correcting system only with one chip, it becomes possible to suppress the cost necessary for the hand shake correction processing.

Moreover, since the sensor module 100 according to the embodiment of the present disclosure can execute the latter stage processing for the effective pixel region, not for the whole valid pixel region, it is possible to reduce the signal processing band necessary for the latter stage processing as compared with the case of performing cutting out the effective pixel region and the hand shake correction processing by the electronic type hand shake correcting system at the latter stage of the sensor module 100. Moreover, the sensor module 100 according to the embodiment of the present disclosure can reduce the power consumption necessary for the latter stage processing as compared with the case of performing cutting out the effective pixel region and the hand shake correction processing by the electronic type hand shake correcting system at the latter stage of the sensor module 100.

In the above, the functional constitution example of the sensor module 100 according to the embodiment of the present disclosure has been described using FIG. 4. Successively, an operation example of the sensor module 100 according to the embodiment of the present disclosure will be described.

[1.4. Operation Example]

Figure 7:
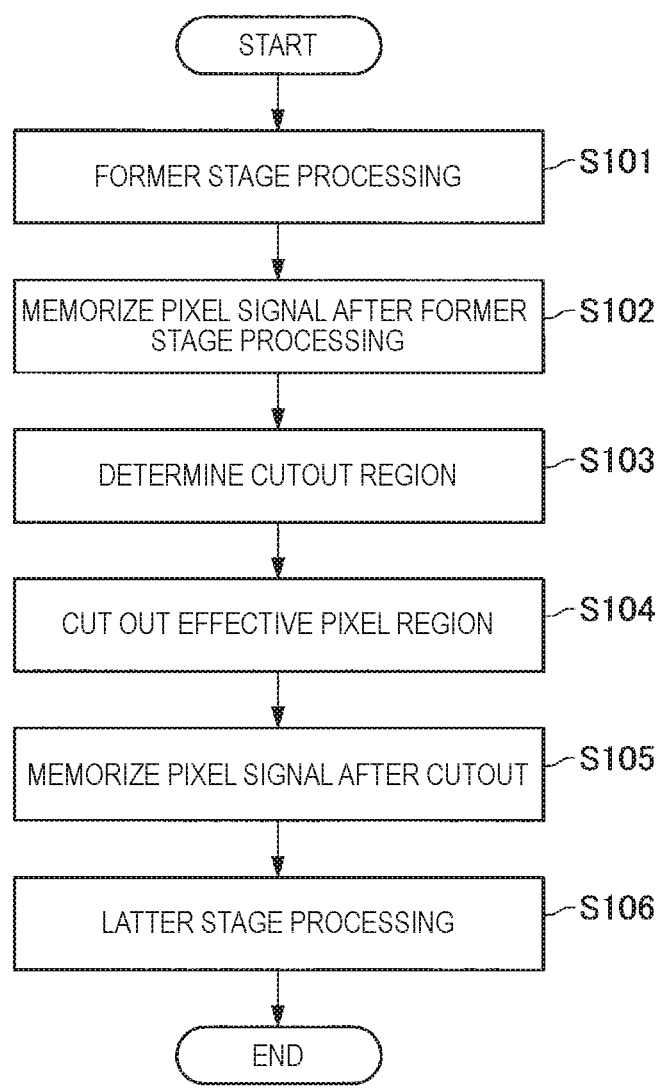
FIG. 7 is a flowchart showing an operation example of a sensor module 100 according to the same embodiment.

FIG. 7 is a flowchart showing an operation example of the sensor module 100 according to the embodiment of the present disclosure. FIG. 7 shows an operation example of the sensor module 100 from the generation of pixel signals and the execution of the latter stage processing for the pixel signals to the outputting to the image processing section 12. Hereinafter, the operation example of the sensor module 100 according to the embodiment of the present disclosure will be described using FIG. 7.

First, the sensor module 100 according to the embodiment of the present disclosure applies the former stage processing for the pixel signals output from the imaging element 111 (Step S101). The former stage processing in Step S101 is executed, for example, by the preprocessing section 131. The former stage processing in Step S101 includes, for example, gain adjustment processing, clamping processing, pixel addition processing, and so on.

Upon execution of the former stage processing in the above-described Step S101, successively, the sensor module 100 memorizes temporarily the pixel signals after having been applied with the former stage processing (Step S102). The sensor module 100 makes the image memory section 121 memorize the pixel signals after having been applied with the former stage processing.

Moreover, the sensor module 100 determines a cutout region for a valid pixel region in order to perform the hand shake correction processing by the electronic type hand shake correcting system (Step S103). The determination processing for the cutout region in Step S103 is performed, for example, by the cutout region determining section 132. At the time of determining the cutout region, for example, the sensor module 100 may perform a motion vector search to estimate a motion amount of an image using pixel signals of a plurality of frames, or, may use sensing data output from a gyro sensor included in the electronic device 10. In the case of performing the motion vector search, the sensor module 100 may perform for the pixel signals of the whole valid pixel region, or, may perform for reduced pixel signals of one bit that are generated by reducing images of the whole valid pixel region and further by expressing color information with monochrome of one bit, in order to simplify the internal processing.

Upon determination of the cutout region for the valid pixel region in the above-described Step S103, successively, the sensor module 100 cuts out an effective pixel region from the pixel signals memorized by the image memory section 121 (Step S104). The cutout processing in Step S104 is performed, for example, by the image cutting-out section 133.

Upon cutout of the effective pixel region in the above-described Step S104, successively, the sensor module 100 memorizes temporarily the pixel signals after the cutout (Step S105). The sensor module 100 makes the image memory section 121 memorize the pixel signals after the cutout. In this connection, the step S105 may be executed in the latter stage processing after the cutout processing without executing in the sensor module 100. Alternatively, the Step S105 itself may be omitted.

Then, the sensor module 100 executes predetermined latter stage processing for the pixel signals, after the cutout, memorized by the image memory section 121 (Step S106). The latter stage processing in Step S106 is executed, for example, by the post processing section 134. The sensor module 100 may execute, as the latter stage processing, for example, automatic white balance processing, automatic exposure processing, distortion correction processing, defect correction processing, noise reduction processing, high dynamic range synthesis processing, and so on.

The sensor module 100 according to the embodiment of the present disclosure can perform hand the shake correction by the electronic type hand shake correcting system with simple processing by executing the operation as shown in FIG. 7. Moreover, the sensor module 100 according to the embodiment of the present disclosure can reduce power consumption by performing the operation as shown in FIG. 7 as compared with the hand shake correction processing by the usual electronic type hand shake correcting system. Therefore, the sensor module 100 according to the embodiment of the present disclosure can improve the efficiency of the hand shake correction processing by the electronic type hand shake correcting system.

Figure 8:
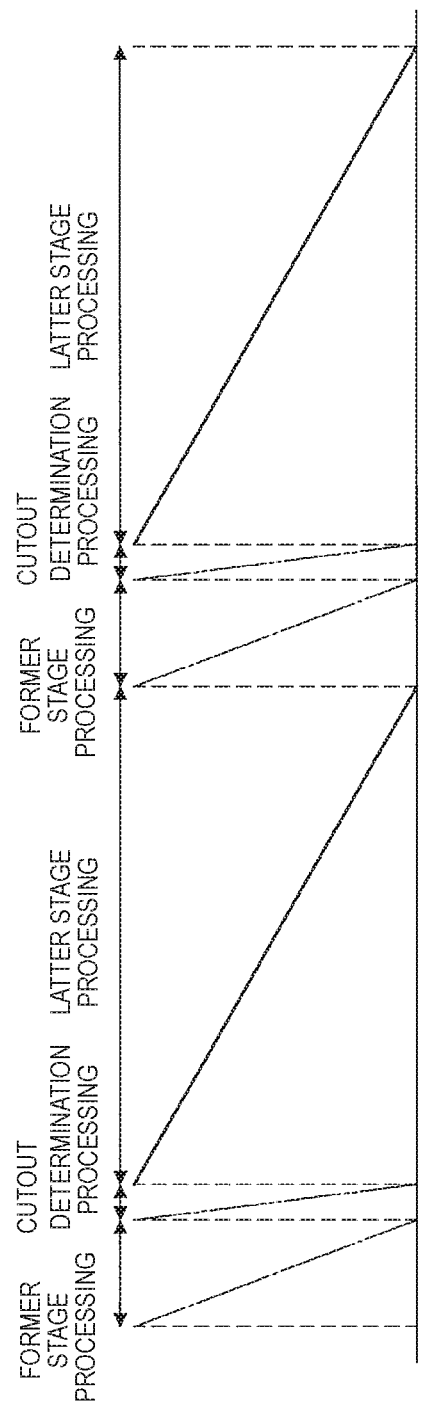
FIG. 8 is an explanatory diagram showing an example of operation time of a sensor module 100.

FIG. 8 is an explanatory diagram showing an example of the operation time of the sensor module 100 in the case of generating reduced pixel signals of one bit from the image of the whole valid pixel region in the case of performing a motion vector search.

In the former stage processing, the sensor module 100 generates reduced pixel signals of one bit from the image of the whole valid pixel region by using only green pixels, and, stores in the image memory section 121. The sensor module 100 calculates a motion vector simply using reduced pixel signals of one bit of a plurality of frames stored in the image memory section 121. Here, the sensor module 100 calculates only a local motion vector necessary for calculating a global motion vector using reduced pixel signals of one bit. Then, the sensor module 100 performs the cutout determination processing to determine a cutout region on the basis of the calculated motion vector, cuts out an effective pixel region on the basis of the cutout region determined by the cutout determination processing, and, executes the latter stage processing.

The sensor module 100 according to the embodiment of the present disclosure can process the former stage processing and the latter stage processing separately via the image memory section 121, whereby the former stage processing can be made to operate at a high rate without limiting its rate to the frame rate, and the latter stage processing can be made to operate over time.

Figure 9:
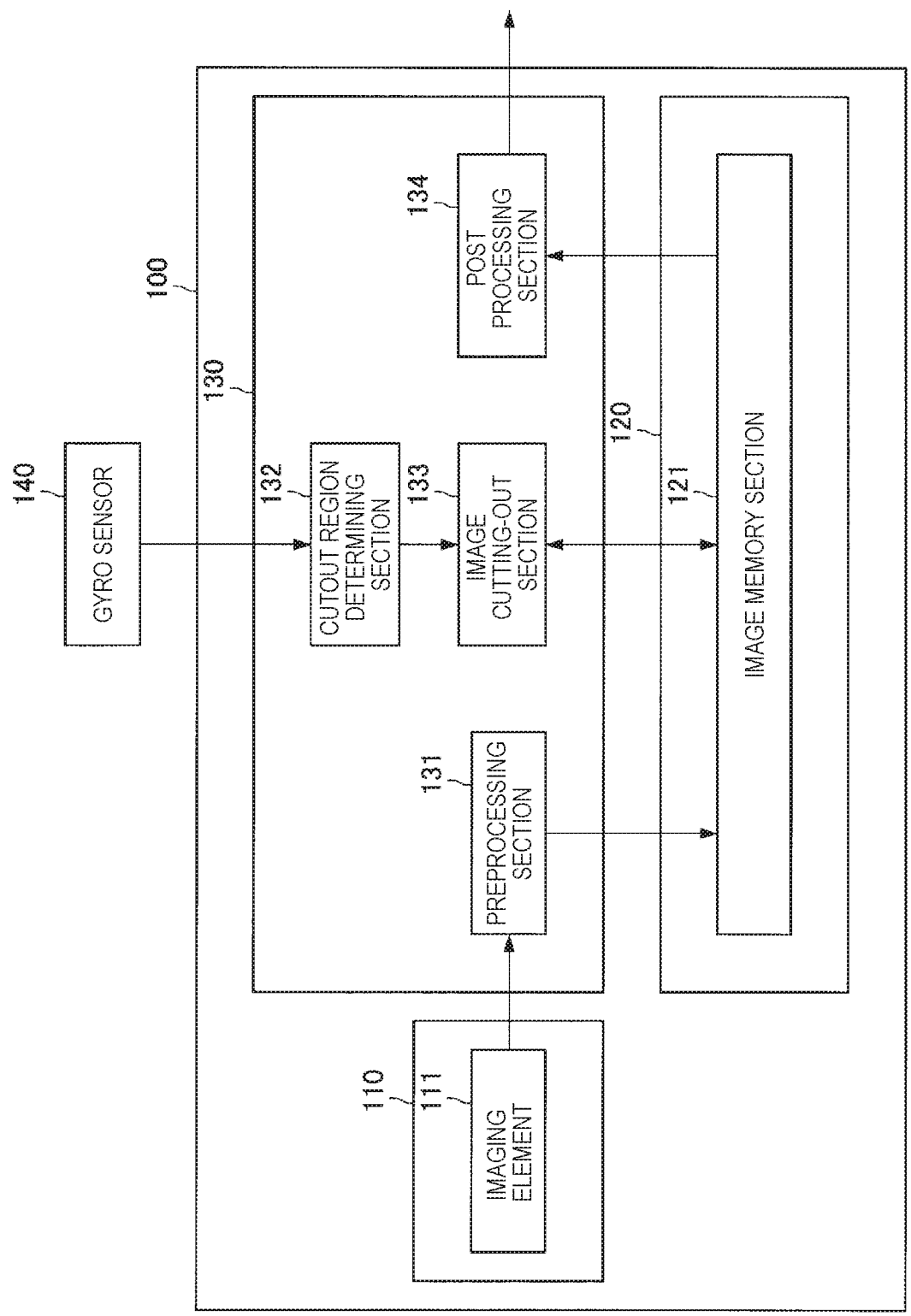
FIG. 9 is an explanatory illustration showing a constitution example of a sensor module 100.

FIG. 9 is an explanatory diagram showing a constitution example of the sensor module 100 in the case of determining a cutout region using the sensing data sent from the gyro sensor 140 disposed in the inside of the electronic device 10. In this connection, the gyro sensor 140 may be provided in the inside of the sensor module 100, or, may be disposed on the outside of the sensor module 100.

In the case of determining a cutout region using the sensing data sent from the gyro sensor 140 disposed in the electronic device 10, as shown in FIG. 9, the cutout region determining section 132 acquires the sensing data, and, determines a cutout region on the basis of the sensing data. The image cutting-out section 133 cuts out an effective pixel region from a valid pixel region on the basis of the cutout region determined by the cutout region determining section 132.

Figure 10:
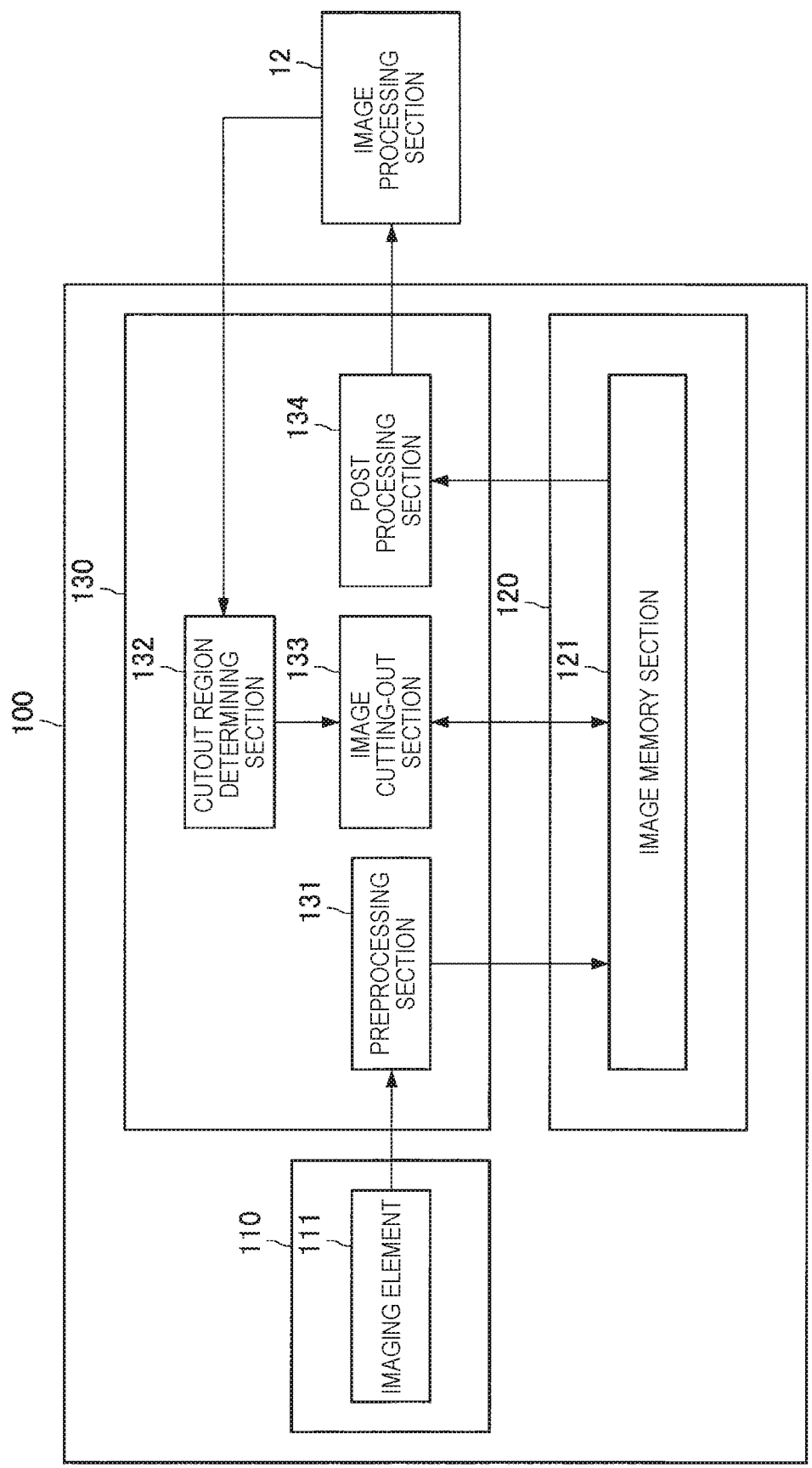
FIG. 10 is an explanatory illustration showing a constitution example of a sensor module 100.

FIG. 10 is an explanatory diagram showing a constitution example of the sensor module 100 in the case of determining a cutout region in cooperation with the image processing section 12.

In an example shown in FIG. 10, the image processing section 12 outputs an amount of a hand shake acquired from the statistics of the acceleration information of a plurality of frames to the sensor module 100. In the case of determining a cutout region in cooperation with the image processing section 12, as shown in FIG. 10, the cutout region determining section 132 acquires an amount of a hand shake from the image processing section 12, and, determines a cutout region on the basis of the amount of a hand shake. The image cutting-out section 133 cuts out an effective pixel region from a valid pixel region on the basis of the cutout region determined by the cutout region determining section 132.

In the case of determining a cutout region in cooperation with the image processing section 12, the sensor module 100 accumulates the pixel signals of a plurality of frames in the image memory section 121. For example, in the case where the image processing section 12 acquires an amount of a hand shake from the statistics of the acceleration information of four frames and outputs the amount of a hand shake to the sensor module 100, the sensor module 100 executes the cutout processing for pixel signals, before the four frames, memorized in the image memory section 121 on the basis of the amount of a hand shake.

The sensor module 100 according to the embodiment of the present disclosure provides the image memory section 121 that can memorize pixel signals of a plurality of frames in the inside, whereby a cutout region is determined in cooperation with the image processing section 12, and, an effective pixel region can be cut out from a valid pixel region on the basis of the determined cutout region. The sensor module 100 according to the embodiment of the present disclosure memorizes pixel signals of a plurality of frames in the inside, whereby it is possible to absorb a delay of the hand shake correction processing by the electronic type hand shake correcting system in the image memory section 121. That is, the sensor module 100 according to the embodiment of the present disclosure can determine a cutout region in a state of taking synchronization with a time point when pixel signals have been generated and a time point when motion information has been acquired. Moreover, the sensor module 100 cuts out an effective pixel region from a valid pixel region in the inside, whereby it is possible to reduce power consumption due to the reduction of a processing angle of view of the latter stage processing section 134. Moreover, the sensor module 100 cuts out an effective pixel region from a valid pixel region in the inside, whereby off-road of an interface band between the sensor module 100 and the image processing section 12 becomes possible.

2. Example of Application to Mobile Objects

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

Figure 11:
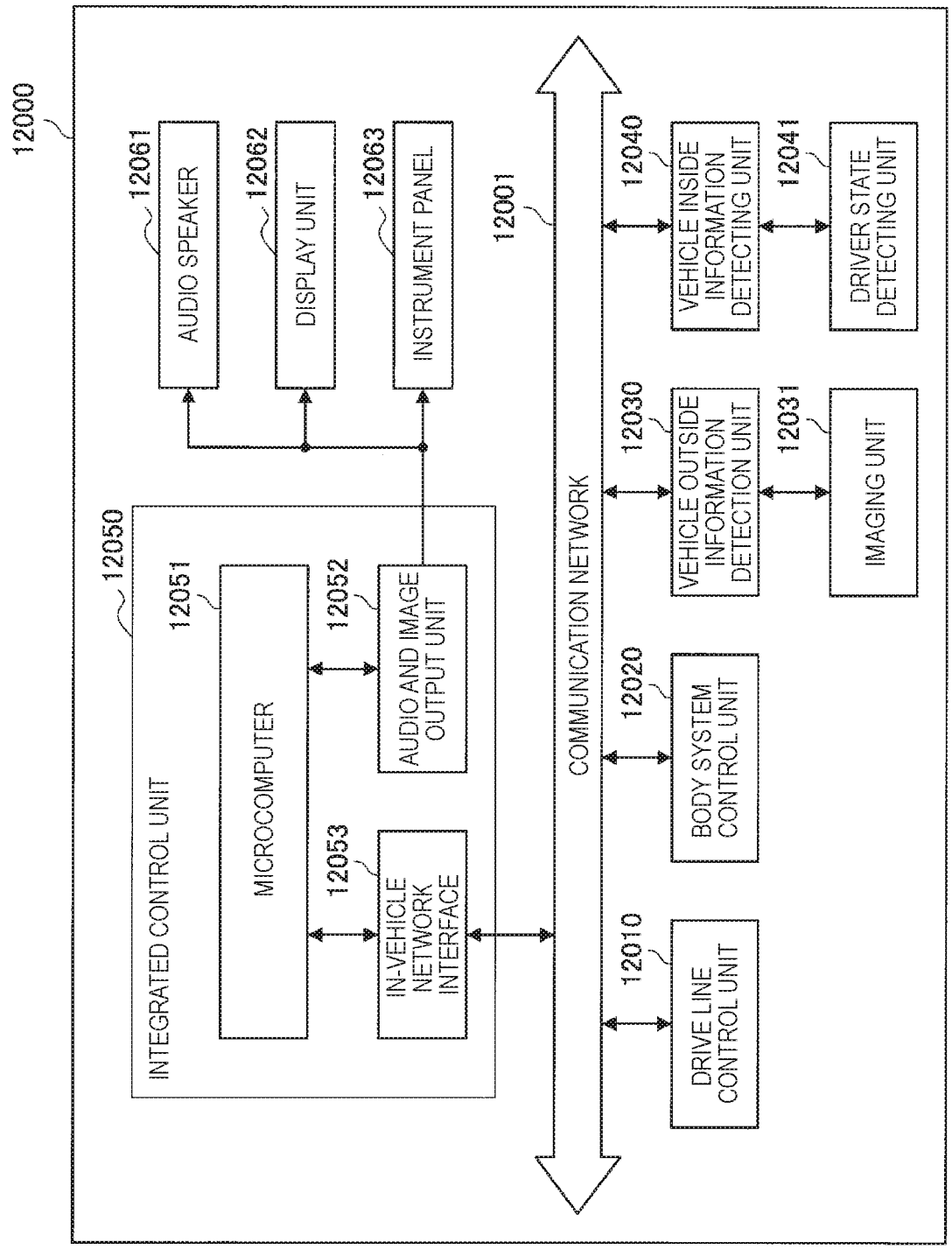
FIG. 11 is a block diagram showing one example of a schematic constitution of a vehicle control system.

FIG. 11 is a block diagram illustrating a schematic configuration example of a vehicle control system which is an example of a mobile object control system to which a technology according to an embodiment of the present technology is applicable.

A vehicle control system 12000 includes a plurality of electronic control units connected via a communication network 12001. In the example illustrated in FIG. 11, the vehicle control system 12000 includes a drive line control unit 12010, a body system control unit 12020, a vehicle outside information detection unit 12030, a vehicle inside information detection unit 12040, and an integrated control unit 12050. In addition, as functional configurations of the integrated control unit 12050, a microcomputer 12051, an audio and image output unit 12052, an in-vehicle network interface (I/F) 12053.

The drive line control unit 12010 controls the operation of devices related to the drive line of the vehicle in accordance with a variety of programs. For example, the drive line control unit 12010 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like.

The body system control unit 12020 controls the operations of a variety of devices attached to the vehicle body in accordance with a variety of programs. For example, the body system control unit 12020 functions as a control device for a keyless entry system, a smart key system, a power window device, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 receives these radio waves or signals, and controls the vehicle door lock device, the power window device, the lights, or the like.

The vehicle outside information detection unit 12030 detects information regarding the outside of a vehicle on which the vehicle control system 12000 is mounted. For example, an imaging unit 12031 is connected to the vehicle outside information detection unit 12030. The vehicle outside information detection unit 12030 causes the imaging unit 12031 to capture an image outside of the vehicle and receives the captured image. The vehicle outside information detection unit 12030 may perform an object detection process or a distance detection process for a person, a vehicle, an obstacle, a sign, letters on a road, or the like on the basis of the received image.

The imaging unit 12031 is a light sensor that receives light and outputs an electric signal in accordance with the amount of received light. The imaging unit 12031 can output the electric signal as an image or distance measurement information. In addition, the light received by the imaging unit 12031 may be the visible light or may be non-visible light such as infrared light.

The vehicle inside information detecting unit 12040 detects information regarding the inside of the vehicle. The vehicle inside information detecting unit 12040 is connected, for example, to a driver state detecting unit 12041 that detects the state of the driver. The driver state detecting unit 12041 may include, for example, a camera that images the driver. The vehicle inside information detecting unit 12040 may compute the degree of the driver's tiredness or the degree of the driver's concentration or determine whether the driver have a doze, on the basis of detection information input from the driver state detecting unit 12041.

For example, the microcomputer 12051 can calculate a control target value of the driving force generating device, the steering mechanism, or the braking device on the basis of information acquired by the vehicle outside information detecting unit 12030 or the vehicle inside information detecting unit 12040 on the inside and outside of the vehicle, and output a control instruction to the drive line control unit 12010. For example, the microcomputer 12051 may perform cooperative control for the purpose of executing the functions of an advanced driver assistance system (ADAS) including vehicle collision avoidance or impact reduction, follow-up driving based on the inter-vehicle distance, constant vehicle speed driving, vehicle collision warning, vehicle lane departure warning, or the like.

Further, the microcomputer 12051 can control the driving force generating device, the steering mechanism, the braking device, or the like on the basis of information acquired by the vehicle outside information detecting unit 12030 or the vehicle inside information detecting unit 12040 on the areas around the vehicle, thereby performing cooperative control for the purpose of automatic driving or the like that allows the vehicle to autonomously travel irrespective of any operation of a driver.

In addition, the microcomputer 12051 can output a control instruction to the body system control unit 12020 on the basis of the information regarding the outside of the vehicle acquired by the vehicle outside information detection unit 12030. For example, the microcomputer 12051 can control a head lamp in accordance with the position of a preceding vehicle or an oncoming vehicle detected by the vehicle outside information detection unit 12030 and can perform cooperative control for the purpose of anti-glaring such as switching a high beam to a low beam.

The audio and image output unit 12052 transmits an output signal of at least one of a sound and an image to an output device capable of visually or aurally notifying a passenger of the vehicle or the outside of the vehicle of information. In the example of FIG. 11, an audio speaker 12061, a display unit 12062, and an instrument panel 12063 are exemplified as the output device. For example, the display unit 12062 may include at least one of an onboard display and a head-up display.

Figure 12:
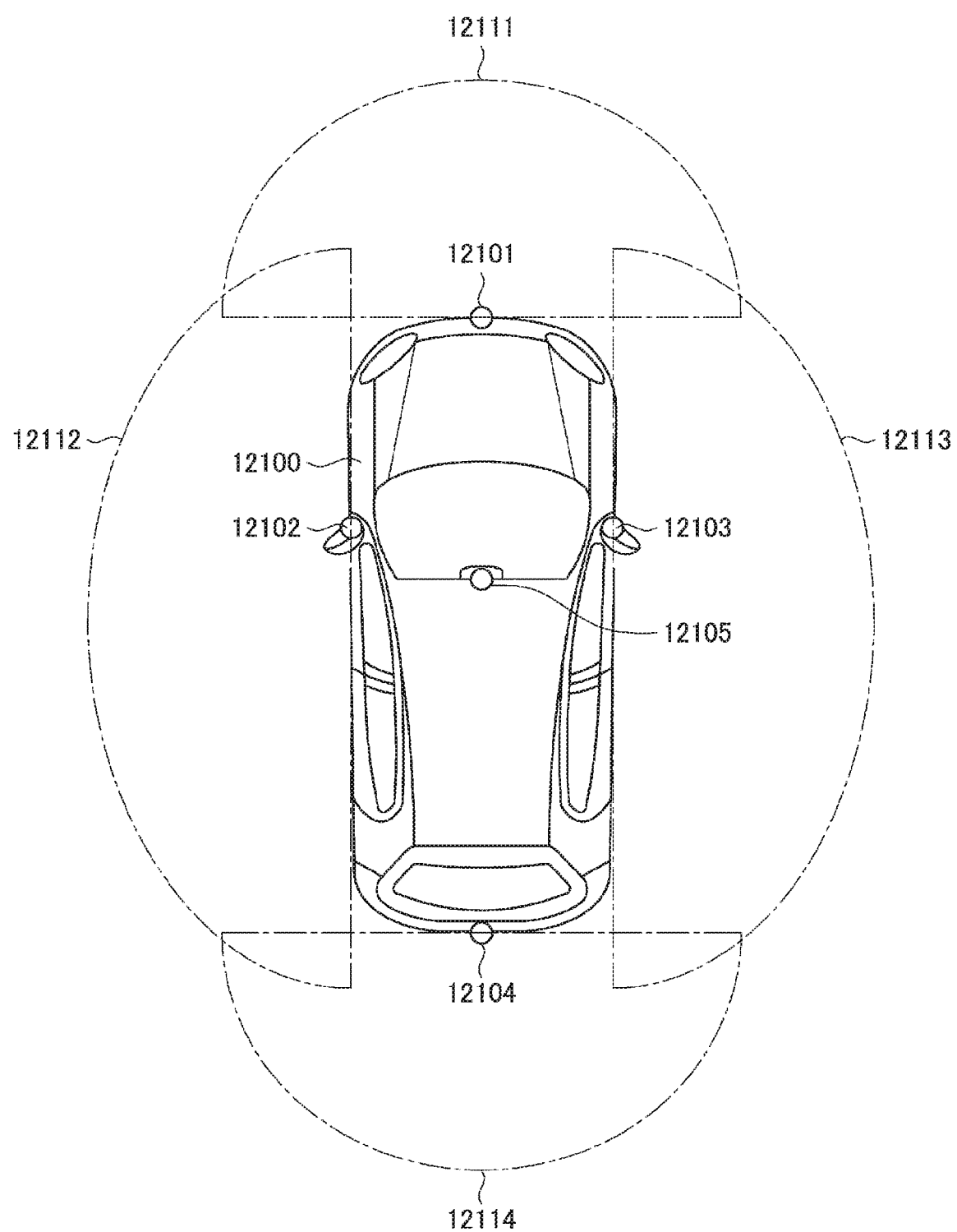
FIG. 12 is an explanatory diagram showing one example of an installation position of a vehicle outside information detecting section and an imaging section.

FIG. 12 is a diagram illustrating an example of an installation position of the imaging unit 12031.

In FIG. 12, the vehicle 12100, as the imaging unit 12031, includes imaging units 12101, 12102, 12103, 12104, and 12105.

Imaging units 12101, 12102, 12103, 12104, and 12105 are positioned, for example, at the front nose, a side mirror, the rear bumper, the back door, and the upper part of the windshield in the vehicle compartment of a vehicle 12100. The imaging unit 12101 attached to the front nose and the imaging unit 12105 attached to the upper part of the windshield in the vehicle compartment chiefly acquire images of the area ahead of the vehicle 12100. The imaging units 12102 and 12103 attached to the side mirrors chiefly acquire images of the areas on the sides of the vehicle 12100. The imaging unit 12104 attached to the rear bumper or the back door chiefly acquires images of the area behind the vehicle 12100. The images of the area ahead acquired by the imaging unit 12101 and the the imaging unit 12105 are used chiefly to detect a preceding vehicle, a pedestrian, an obstacle, a traffic light, a traffic sign, a lane, or the like.

Additionally, FIG. 12 illustrates an example of the imaging ranges of the imaging units 12101 to 12104. An imaging range 12111 represents the imaging range of the imaging unit 12101 attached to the front nose. Imaging ranges 12112 and 12113 respectively represent the imaging ranges of the imaging units 12102 and 12103 attached to the side mirrors. An imaging range 12114 represents the imaging range of the imaging unit 12104 attached to the rear bumper or the back door. For example, overlaying image data captured by the imaging units 12101 to 12104 offers an overhead image that looks down on the vehicle 12100.

At least one of the imaging units 12101 to 12104 may have a function of acquiring distance information. For example, at least one of the imaging units 12101 to 12104 may be a stereo camera including a plurality of image sensors or may be an image sensor that includes pixels for phase difference detection.

For example, the microcomputer 12051 can extract a 3-dimensional object traveling at a predetermined speed (for example, 0 or more km/h) in substantially the same direction as the vehicle 12100 as a preceding vehicle by particularly using a closest 3-dimensional object on a travel road of the vehicle 12100 by obtaining a distance to each 3-dimensional object within the imaging ranges 12111 to 12114 and a temporal change in the distance (a relative speed to the vehicle 12100) on the basis of distance information obtained from the imaging units 12101 to 12104. Further, the microcomputer 12051 can set an inter-vehicle distance to be ensured in advance before a preceding vehicle and perform automatic brake control (also including follow-up stop control) or automatic acceleration control (also including follow-up oscillation control). In this way, it is possible to perform cooperative control for the purpose of automatic driving or the like that allows the vehicle to autonomously travel irrespective of any operation of a driver.

For example, the microcomputer 12051 can classify and extract 3-dimensional object data regarding 3-dimensional objects as other 3-dimensional objects such as motorcycles, normal vehicles, large vehicles, pedestrians, and electric poles on the basis of the distance information obtained from the imaging units 12101 to 12104 and can use the other 3-dimensional objects to automatically avoid obstacles. For example, the microcomputer 12051 identifies obstacles around the vehicle 12100 as obstacles which can be viewed by a driver of the vehicle 12100 and obstacles which are difficult to view. Then, the microcomputer 12051 can determine a collision risk indicating a danger of collision with each obstacle and output a warning to the driver via the audio speaker 12061 or the display unit 12062 in a situation in which there is a collision possibility since the collision risk is set to be equal to or greater than a set value or can perform driving assistance for collision avoidance by performing forced deceleration or avoidance steering iv via the drive line control unit 12010.

At least one of the imaging units 12101 to 12104 may be an infrared camera that detects infrared light. For example, the microcomputer 12051 can recognize a pedestrian by determining whether there is the pedestrian in captured images of the imaging units 12101 to 12104. The pedestrian can be recognized, for example, in a procedure in which feature points are extracted in the captured images of the imaging units 12101 to 12104 serving as infrared cameras and a procedure in which a series of feature points indicating a contour of an object are subjected to a pattern matching process to determine whether there is the pedestrian. The microcomputer 12051 determines that there is the pedestrian in the captured images of the imaging units 12101 to 12104. When the pedestrian is recognized, the audio and image output unit 12052 controls the display unit 12062 such that a rectangular contour line for emphasis is superimposed to be displayed on the recognized pedestrian. In addition, the audio and image output unit 12052 controls the display unit 12062 such that an icon or the like indicating the pedestrian is displayed at a desired position.

In the above, one example of the vehicle control system to which the technology according to the present disclosure can be applied has been described. The technology according to the present disclosure can be applied to the imaging section 12031 and so on among the constitution having been described in the above. By applying the technology according to the present disclosure to the imaging section 12031 and so on, it is possible to generate image for which a shake has been prevented.

3. Conclusion

As described in the above, according to the embodiment of the present disclosure, it is possible to provide a sensor module 100 that can perform hand shake correction by an electronic type hand shake correcting system with simple processing and can improve the efficiency of the hand shake correction processing by the electronic type hand shake correcting system by reducing power consumption as compared with the hand shake correction processing by the usual electronic type hand shake correcting system.

The sensor module 100 according to the embodiment of the present disclosure executes signal processing with regard to an image for pixel signals of an effective pixel region after having executed the hand shake correction processing by the electronic type hand shake correcting system. The sensor module 100 according to the embodiment of the present disclosure can reduce power consumption as compared with the case of executing signal processing with regard to an image for the whole valid pixel region.

The sensor module 100 according to the embodiment of the present disclosure executes the hand shake correction processing by the electronic type hand shake correcting system after making the image memory section 121 memorize once pixel signals output from the imaging element 111. With this, the sensor module 100 according to the embodiment of the present disclosure can convert the processing rates of the former stage processing and the latter stage processing.

The sensor module 100 according to the embodiment of the present disclosure can make the former stage processing operate at a high rate, and, make the latter stage processing operate in matching with the processing rate of the application processor (AP) of the latter stage of the sensor module 100. Moreover, the sensor module 100 according to the embodiment of the present disclosure can prevent the occurrence of focal plane distortion by making the former stage processing operate at a high rate.

The sensor module 100 according to the embodiment of the present disclosure executes the hand shake correction processing by the electronic type hand shake correcting system in the inside of the sensor module 100 for the pixel signals memorized in the image memory section 121. The sensor module 100 according to the embodiment of the present disclosure executes the hand shake correction processing by the electronic type hand shake correcting system in the inside of the sensor module 100, whereby it becomes possible to reduce a processing amount, power consumption, and an interface band as compared with the case of executing the hand shake correction processing in the latter stage of the sensor module 100.

The sensor module 100 according to the embodiment of the present disclosure can make the sensor module 100 side absorb a processing delay in an application processor by making the image memory section 121 memorize pixel signals. That is, even in the case where a motion amount of an image is calculated on the application processor (image processing section 12) side on the basis of the data of a plurality of frames, the sensor module 100 can execute hand shake correction processing retroactively for the past frames.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing apparatus, including:
a memory section that memorizes a pixel signal output from an imaging element;
a region determining section that determines a cutout region of the pixel signal memorized in the memory section on a basis of motion information of the imaging element; and
an image processing section that executes image processing with regard to image quality for a pixel signal in the cutout region determined by the region determining section.

(2)

The image processing apparatus according to (1), in which the region determining section statistically calculates the motion information of the imaging element, by using information on the pixel signals of a plurality of frames.

(3)

The image processing apparatus according to (1) or (2), in which the region determining section determines the cutout region by using a reduced pixel signal obtained by reducing the pixel signal.

(4)

The image processing apparatus according to any of (1) to (3), including:
a motion information detecting section that detects the motion information of the imaging element,
in which the region determining section determines the cutout region on a basis of sensing data output from the motion information detecting section.

(5)

The image processing apparatus according to any of (1) to (3), in which the region determining section determines the cutout region on a basis of sensing data output from an external sensor.

(6)

The image processing apparatus according to any of (1) to (5), in which the region determining section determines the cutout region in a state in which a time point when a pixel signal has been generated and a time point when the motion information has been acquired are synchronized with each other.

(7)

The image processing apparatus according to any of (1) to (6), further including: a preprocessing section that sends a pixel signal output from the imaging element to the memory section, in which a rate at which the preprocessing section sends the pixel signal to the memory section, is faster than a rate at which the image processing section reads out the pixel signal memorized in the memory section.

(8)

The image processing apparatus according to any of (1) to (7), in which image processing executed by the image processing section with regard to image quality is at least any one of automatic white balance processing, automatic exposure processing, distortion correction processing, defect correction processing, noise reduction processing, and high dynamic range synthesis processing.

(9)

The image processing apparatus according to any of (1) to (8), including:
three stacked semiconductor substrates including a first semiconductor substrate, a second semiconductor substrate, and a third semiconductor substrate,
in which, on the first semiconductor substrate, at least the imaging element is formed,
on the second semiconductor substrate, at least the memory section is formed, and
on the third semiconductor substrate, at least the region determining section and the image processing section are formed.

(10)

The image processing apparatus according to (9), in which the second semiconductor substrate is disposed between the first semiconductor substrate and the third semiconductor substrate.

(11)

The image processing apparatus according to (9), in which the third semiconductor substrate is disposed between the first semiconductor substrate and the second semiconductor substrate.

(12)

An image processing method, including:
memorizing a pixel signal output from an imaging element;
determining a cutout region of the memorized pixel signal on a basis of motion information of the imaging element; and
executing image processing with regard to image quality for a pixel signal in the determined cutout region.

(13)

A computer program that makes a computer execute:
memorizing a pixel signal output from an imaging element;
determining a cutout region of the memorized pixel signal on a basis of motion information of the imaging element; and
executing image processing with regard to image quality for a pixel signal in the determined cutout region.

(14)

An electronic device, including:
the image processing apparatus according to any of (1) to (11).

REFERENCE SIGNS LIST

10 electronic device
100 sensor module

The invention claimed is:
1. An image processing apparatus, comprising:
a memory section;
a preprocessing section configured to:
execute a first signal process on a plurality of pixel signals at a first frame rate higher than an output frame rate of the image processing apparatus;
generate reduced pixel signals from the plurality of pixel signals based on the executed first signal process, wherein
the plurality of pixel signals corresponds to an image output from an imaging element, and
the reduced pixel signals are associated with a plurality of frames; and transmit the reduced pixel signals to the memory section, wherein the memory section is configured to store the reduced pixel signals transmitted by the preprocessing section;
a region determining section configured to:
calculate motion information of the imaging element based on information associated with the stored reduced pixel signals; and
determine a cutout region of the image based on the stored reduced pixel signals, the calculated motion information of the imaging element, and synchronization of a first time point and a second time point, wherein
the first time point corresponds to a time of the generation of the reduced pixel signals, and
the second time point corresponds to a time of the calculation of the motion information of the imaging element;
an image cutting-out section configured to cut out an effective pixel region of the image based on the determined cutout region, wherein
a set of reduced pixel signals of the reduced pixel signals corresponds to the effective pixel region, and
the memory section is further configured to store the set of reduced pixel signals after the cutout of the effective pixel region; and
a post processing section configured to:
read out the stored set of reduced pixel signals; and
execute a second signal process, at a second frame rate slower than the first frame rate, for the effective pixel region based on the read out of the stored set of reduced pixel signals, wherein the first signal process is different from the second signal process.

2. The image processing apparatus according to claim 1, further comprising a sensor configured to detect the motion information of the imaging element.

3. The image processing apparatus according to claim 1, wherein the second signal process is at least one of an automatic white balance process, an automatic exposure process, a distortion correction process, a defect correction process, a noise reduction process, or a high dynamic range synthesis process.

4. The image processing apparatus according to claim 1, further comprising three stacked semiconductor substrates including a first semiconductor substrate, a second semiconductor substrate, and a third semiconductor substrate, wherein
the first semiconductor substrate includes the imaging element,
the second semiconductor substrate includes the memory section, and
the third semiconductor substrate includes the image cutting-out section, the region determining section, and the post processing section.

5. The image processing apparatus according to claim 4, wherein the second semiconductor substrate is between the first semiconductor substrate and the third semiconductor substrate.

6. The image processing apparatus according to claim 4, wherein the third semiconductor substrate is between the first semiconductor substrate and the second semiconductor substrate.

7. The image processing apparatus according to claim 1, wherein the first signal process includes one of a gain adjustment process, a clamping process, or a pixel addition process.

8. The image processing apparatus according to claim 1, wherein the motion information includes information related to a direction of motion of the imaging element.

9. An image processing method, comprising:
in an image processing apparatus that includes a preprocessing section, a memory section, a region determining section, an image cutting-out section, and a post processing section:
executing, by the preprocessing section, a first signal process on a plurality of pixel signals at a first frame rate higher than an output frame rate of the image processing apparatus;
generating, by the preprocessing section, reduced pixel signals from the plurality of pixel signals based on the executed first signal process,
wherein the plurality of pixel signals corresponds to an image output from an imaging element, and
the reduced pixel signals are associated with a plurality of frames;
transmitting, by the preprocessing section, the reduced pixel signals to the memory section;
storing, in the memory section, the reduced pixel signals transmitted by the preprocessing section;
calculating, by the region determining section, motion information of the imaging element based on information associated with the stored reduced pixel signals;
determining, by the region determining section, a cutout region of the image based on the stored reduced pixel signals, the calculated motion information of the imaging element, and synchronization of a first time point and a second time point, wherein
the first time point corresponds to a time of the generation of the reduced pixel signals, and
the second time point corresponds to a time of the calculation of the motion information of the imaging element;
cutting out, by the image cutting-out section, an effective pixel region of the image based on the determined cutout region, wherein a set of reduced pixel signals of the reduced pixel signals corresponds to the effective pixel region;
storing, in the memory section, the set of reduced pixel signals after the cutout of the effective pixel region;
reading out, by the post processing section, the stored set of reduced pixel signals; and
executing, by the post processing section, a second signal process, at a second frame rate slower than the first frame rate, for the effective pixel region based on the reading out of the stored set of reduced pixel signals,
wherein the first signal process is different from the second signal process.

10. A non-transitory computer-readable medium having stored thereon computer-executable instructions which, when executed by a computer, cause the computer to execute operations, the operations comprising:
executing a first signal process on a plurality of pixel signals at a first frame rate;
generating reduced pixel signals from the plurality of pixel signals based on the executed first signal process, wherein
the plurality of pixel signals corresponds to an image output from an imaging element, and
the reduced pixel signals are associated with a plurality of frames;

transmitting the reduced pixel signals to a memory section;
storing the transmitted reduced pixel signals in the memory section;
calculating motion information of the imaging element based on information associated with the stored reduced pixel signals;
determining a cutout region of the image based on the stored reduced pixel signals, the calculated motion information of the imaging element, and synchronization of a first time point and a second time point, wherein
 the first time point corresponds to a time of the generation of the reduced pixel signals, and
 the second time point corresponds to a time of the calculation of the motion information of the imaging element;
cutting out an effective pixel region of the image based on the determined cutout region, wherein a set of reduced pixel signals of the reduced pixel signals corresponds to the effective pixel region;
storing, in the memory section, the set of reduced pixel signals after the cutout of the effective pixel region;
reading out the stored set of reduced pixel signals; and
executing a second signal process, at a second frame rate slower than the first frame rate, for the effective pixel region based on the reading out of the stored set of reduced pixel signals, wherein the first signal process is different from the second signal process.

11. An electronic device, comprising:
an image processing apparatus that comprises:
 a memory section;
 a preprocessing section configured to:
  execute a first signal process on a plurality of pixel signals at a first frame rate higher than an output frame rate of the image processing apparatus;
  generate reduced pixel signals from the plurality of pixel signals based on the executed first signal process, wherein
   the plurality of pixel signals corresponds to an image output from an imaging element, and
   the reduced pixel signals are associated with a plurality of frames; and
  transmit the reduced pixel signals to the memory section,
   wherein the memory section is configured to store the reduced pixel signals transmitted by the preprocessing section;
 a region determining section configured to:
  calculate motion information of the imaging element based on information associated with the stored reduced pixel signals; and
  determine a cutout region of the image based on the stored reduced pixel signals, the calculated motion information of the imaging element, and synchronization of a first time point and a second time point, wherein
   the first time point corresponds to a time of the generation of the reduced pixel signals, and
   the second time point corresponds to a time of the calculation of the motion information of the imaging element;
 an image cutting-out section configured to cut out an effective pixel region of the image based on the determined cutout region, wherein
  a set of reduced pixel signals of the reduced pixel signals corresponds to the effective pixel region, and
  the memory section is further configured to store the set of reduced pixel signals after the cutout of the effective pixel region; and
 a post processing section configured to:
  read out the stored set of reduced pixel signals; and
  execute a second signal process, at a second frame rate slower than the first frame rate, for the effective pixel region based on the read out of the stored set of reduced pixel signals, wherein the first signal process is different from the second signal process.

* * * * *